(12) United States Patent
Compagnucci

(10) Patent No.: US 7,748,800 B2
(45) Date of Patent: Jul. 6, 2010

(54) DEVICE FOR AUTOMATIC SHOCK-ABSORBED CLOSING OF DRAWERS AND PULL-OUT FURNITURE ELEMENTS

(75) Inventor: Rossano Compagnucci, Santa Maria Nuova (IT)

(73) Assignee: Compagnucci S.p.A., Santa Maria Nuova (AN) (IT)

( * ) Notice: Subject to any disclaimer, the term of this patent is extended or adjusted under 35 U.S.C. 154(b) by 182 days.

(21) Appl. No.: 11/977,775

(22) Filed: Oct. 26, 2007

(65) Prior Publication Data

US 2009/0045710 A1     Feb. 19, 2009

Related U.S. Application Data

(62) Division of application No. 10/999,239, filed on Nov. 30, 2004, now abandoned.

(30) Foreign Application Priority Data

Dec. 5, 2003     (IT)     .......................... MC2003A0144

(51) Int. Cl.
*A47B 95/00* (2006.01)
(52) U.S. Cl. ................ 312/333; 312/330.1; 312/334.44
(58) Field of Classification Search ............. 312/334.6, 312/334.45, 334.14, 334.15, 334.25, 334.31, 312/334.32–334.34, 334.38, 334.44, 330.1; 384/21
See application file for complete search history.

(56) References Cited

U.S. PATENT DOCUMENTS

| | | | | |
|---|---|---|---|---|
| 3,178,167 | A * | 4/1965 | Loewis ..................... | 267/64.21 |
| 5,474,375 | A * | 12/1995 | Hollenstein et al. ...... | 312/319.1 |
| 5,720,369 | A * | 2/1998 | Thorn ........................ | 188/300 |
| 6,053,486 | A * | 4/2000 | Schuitema et al. ........ | 267/64.15 |
| 6,315,093 | B1 * | 11/2001 | Miura et al. ............. | 188/282.1 |
| 6,712,435 | B2 * | 3/2004 | Kim et al. ................ | 312/319.1 |
| 6,736,471 | B2 * | 5/2004 | Lin ............................ | 312/333 |
| 7,108,339 | B2 * | 9/2006 | Berger ........................ | 312/333 |
| 7,399,041 | B2 * | 7/2008 | Prentner et al. ............. | 312/333 |
| 2003/0075845 | A1 * | 4/2003 | Krammer .................. | 267/64.11 |
| 2005/0098394 | A1 * | 5/2005 | Baldreich .................... | 188/67 |

FOREIGN PATENT DOCUMENTS

| | | | | |
|---|---|---|---|---|
| DE | 4418335 | * | 12/1994 | ............ 312/334.44 |
| EP | 391221 | * | 10/1990 | ................. 312/333 |
| EP | 1378680 | * | 1/2004 | |

* cited by examiner

*Primary Examiner*—Hanh V Tran
(74) *Attorney, Agent, or Firm*—Hodes, Pessin & Katz, P.A.

(57) ABSTRACT

A device for automatic shock-absorbed closing of drawers and pull-out furniture elements in general, which comprises a hydraulic cylinder with a piston used to pour oil from one chamber to the other one and a return spring inserted into the piston stem, whose end is used to fasten and unfasten the stem automatically to and from a special bracket suitably fitted to the pull-out element.

6 Claims, 3 Drawing Sheets

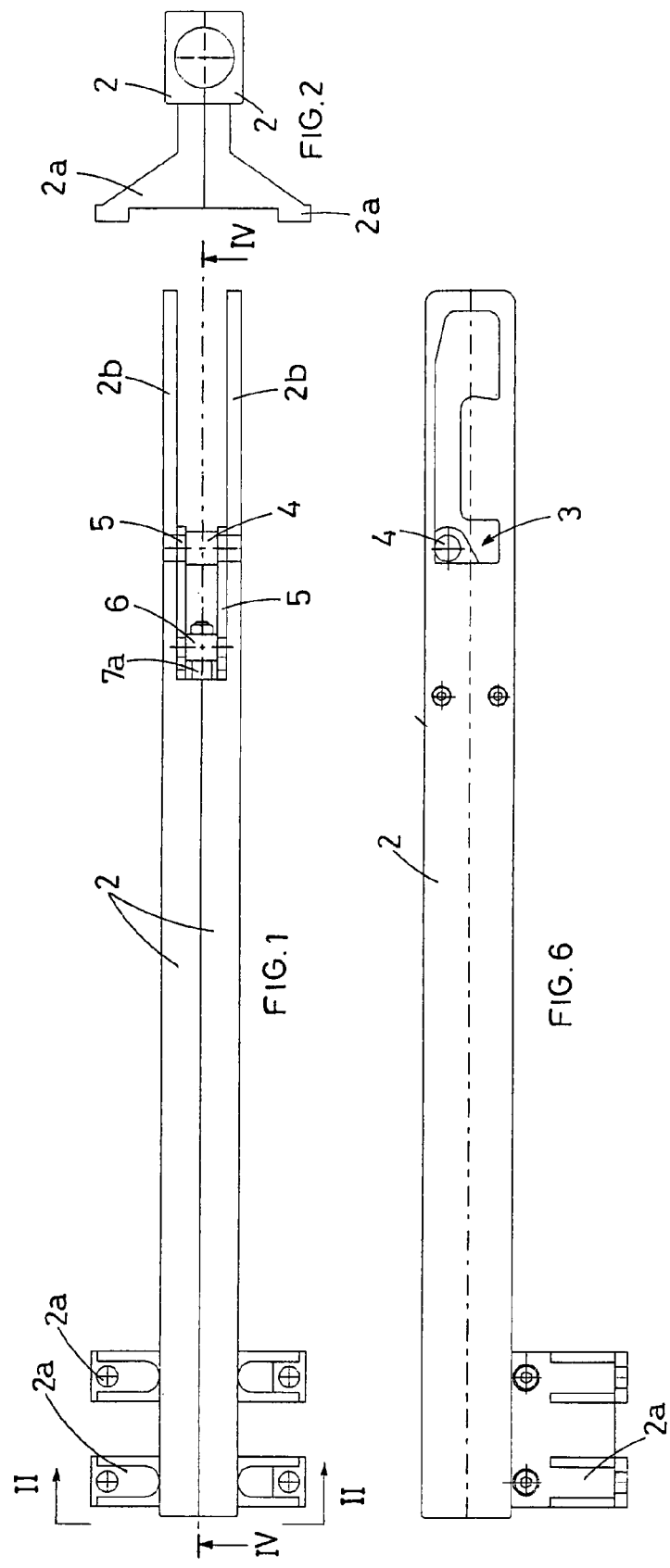

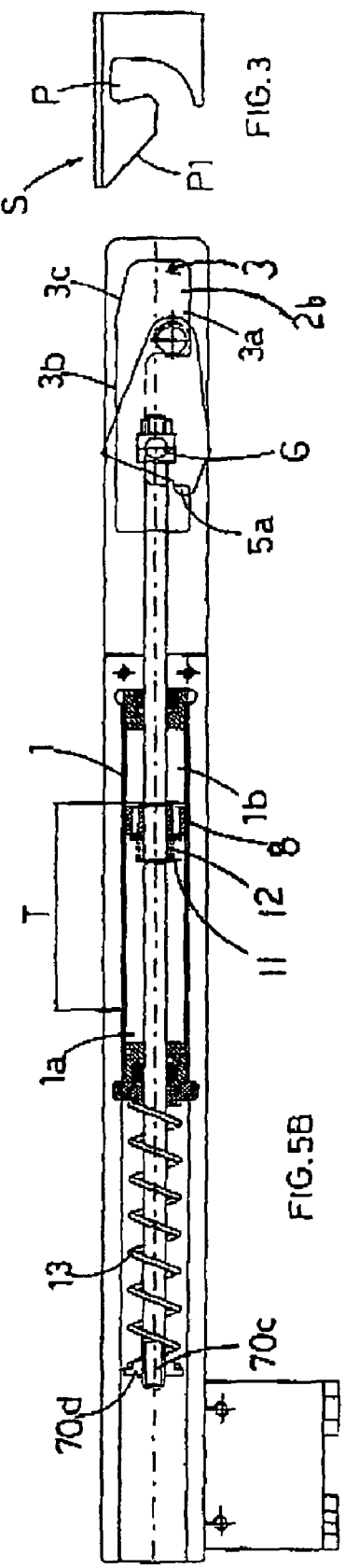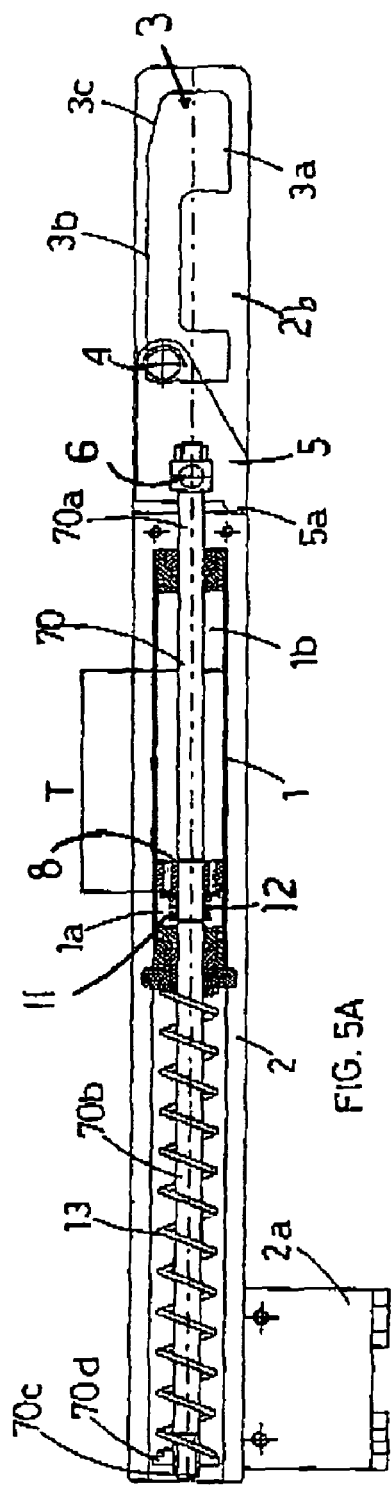
FIG. 3
FIG. 5A
FIG. 5B

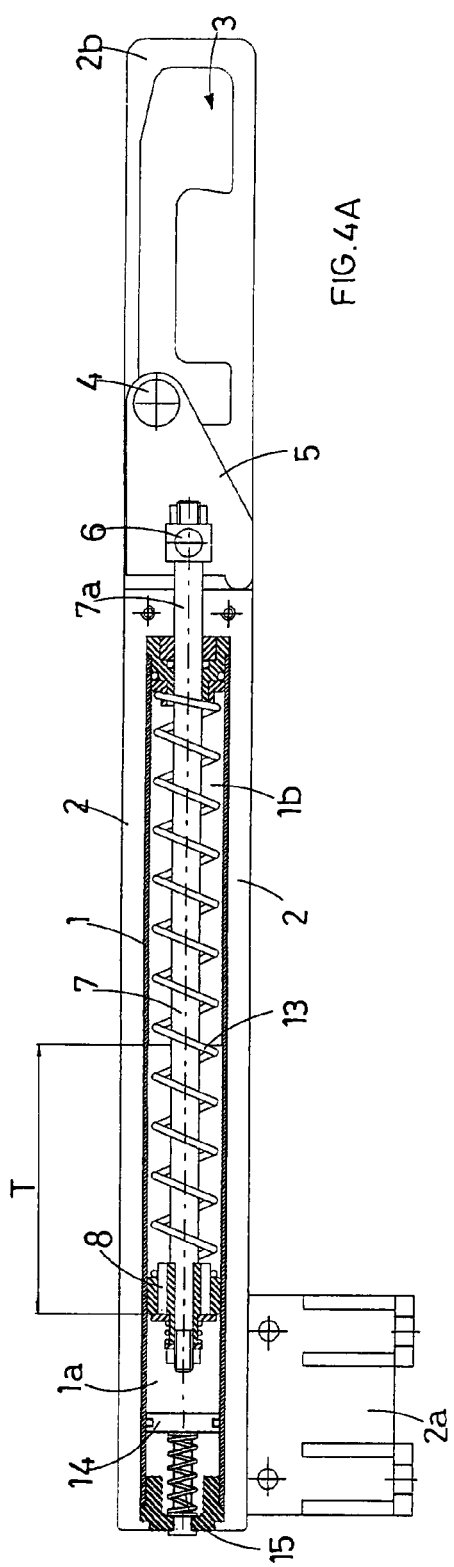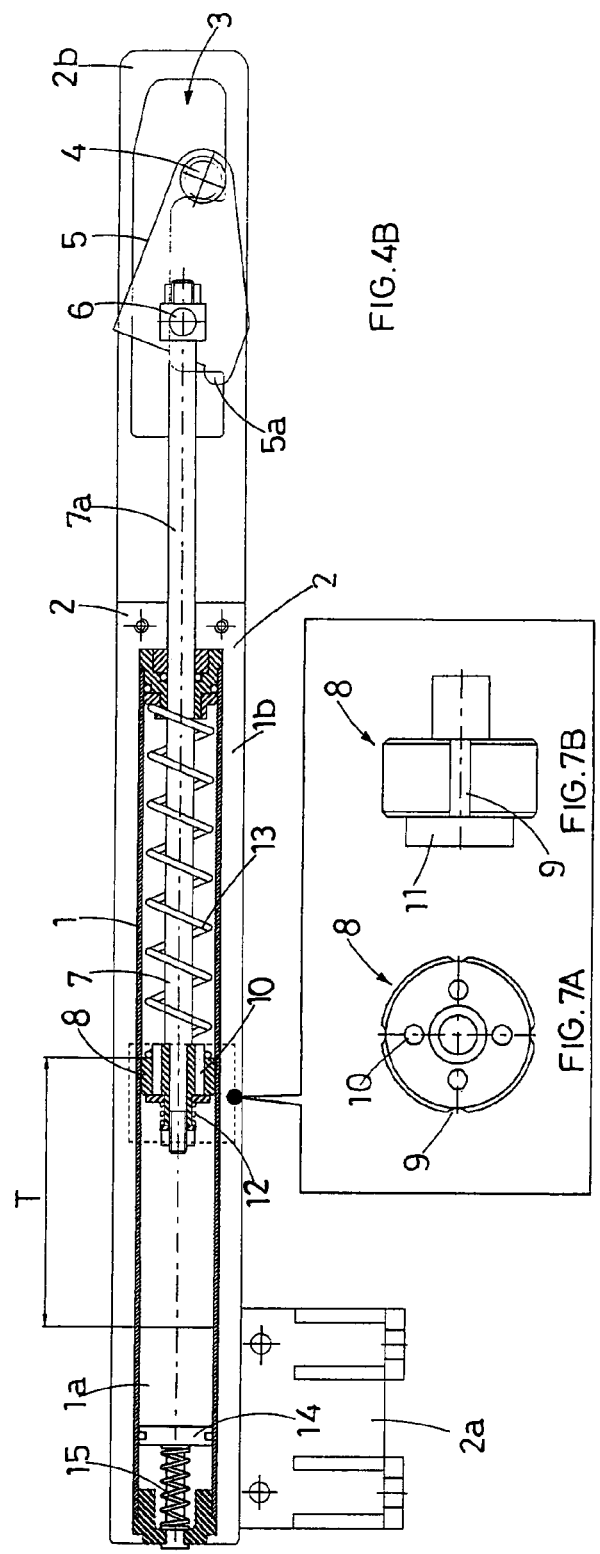

DEVICE FOR AUTOMATIC SHOCK-ABSORBED CLOSING OF DRAWERS AND PULL-OUT FURNITURE ELEMENTS

CROSS REFERENCE TO RELATED APPLICATIONS

This application is a divisional application of prior application Ser. No. 10/999,239 filed Nov. 30, 2004, now abandoned the entirety of which is incorporated by reference.

BACKGROUND OF THE INVENTION

The present patent application refers to a device for automatic shock-absorbed closing of drawers and pull-out furniture elements in general. Similar devices are known, although they are impaired by a series of drawbacks, such as complex construction, excessive volume and poor versatility, meaning that they cannot be installed in existing drawers, if the drawers were not designed for such an accessory.

Another limitation of some of the known devices is represented by their incapability to restore the operation condition automatically if the fastening means accidentally lose their correct operation position when released from the drawer.

A further drawback of known devices is represented by the fact that they provide a vibrating braking action because they use a pneumatic cylinder as shock-absorbing member.

The higher the closing speed of the drawer, the louder the vibrating effect is, due to the fact that the sudden powerful compression of the air contained in the cylinder causes a sort of "pump effect" that causes vibrations during the final part of the closing travel of the drawer, when the drawer is fastened and pulled by a spring used to push the drawer to the end of its travel.

The device of the invention comprises a hydraulic cylinder designed to be tightened to a fixed part of the cabinet, such as for example the walls or the fixed runner of the drawer.

The piston of the hydraulic cylinder has a perimeter series of longitudinal grooves that allow to pour oil from one chamber to the other one during alternate travels of the piston, whose stem is automatically fastened to the drawer in the ending part of the closing travel of the drawer, and automatically released after the first part of the following opening travel.

The piston is also provided with an additional series of holes closed by a monodirectional valve that allows the oil to seep during the entire extraction travel of the drawer. In view of the above, the opening of the drawer is not braked by the piston, since the oil is poured freely from one chamber to the other one of the cylinder, by means of multiple spaces, such as the series of momentarily open holes and the series of always open perimeter grooves.

A helicoidal cylindrical spring is externally inserted into the stem of the piston, whose alternate travels determine the compression and extension of the spring, which automatically closes the drawer after the drawer is about to be perfectly and completely inserted into the corresponding housing.

More precisely, the spring is compressed during the first part of the opening travel and extended during the ending part of the closing travel of the drawer. It must be said that when the stem of the hydraulic cylinder is automatically released from the drawer during extraction, the stem is automatically held by suitable blocking means that hold it in the extraction position until the drawer refastens the stem during the following closing travel, while excluding the fastening means, with consequent spontaneous extension of the spring that in turn remains compressed until the drawer is open.

This means that—once the connection between the drawer and the stem of the hydraulic cylinder has been restored—the spring pulls the drawer until it is perfectly closed, thus remedying the users negligence, if the user doesn't hold the drawer long enough or doesn't push it with adequate strength for complete closing.

The shock-absorbing action of the hydraulic cylinder is performed in this stage to avoid that a very energetic push may cause heaving shocks to the drawer at the end of the closing travel, with consequent stress for the entire cabinet, and especially for the front door of the drawer that touches the sides of the cabinet.

During the extension of the spring—which occurs when the drawer is pushed closed—the oil slowly flows back through the series of grooves along the border of the piston, whose additional overflow holes are momentarily closed by a monodirectional valve.

The resistance encountered by the oil when passing from a chamber to the other one of the cylinder ensures braking when the drawer is closed at a very high speed.

In order to ensure soft gradual braking, the chamber of the cylinder where the oil is poured when the drawer is opened is slightly conical, so that the annular space between the piston and the internal walls of the chamber gradually reduces as long as the piston moves backwards with the drawer.

For major clarity, the description of the device of the invention continues with reference to the enclosed drawings, which are shown with illustrative purpose only, and not in a limiting sense, whereby:

FIG. 1 is a top view of the device of the invention;

FIG. 2 is a left view of FIG. 1;

FIG. 3 is a view of the bracket of the device of the invention, which is designed to be fitted to the drawer for automatic fastening and unfastening of the drawer with respect to the device, during alternate closing and opening travels, respectively;

FIGS. 4A and 4B are cross-sections of the device of the invention with plane IV-IV of FIG. 1, which show the position of the device with the drawer in completely closed and open position, respectively;

FIGS. 5A and 5B are cross-sections of the device of the invention, same as the preceding ones, except for the fact that they refer to a second embodiment of the device of the invention;

FIG. 6 is a side view of FIG. 1;

FIGS. 7A and 7B are views of the piston of the hydraulic cylinder.

With reference to the aforementioned figures, the device of the invention comprises an hydraulic cylinder (1) supported by an opposite pair of identical semi-shells (2), respectively provided at one end with brackets (2a) for stable anchoring inside the body of the cabinet where the cylinder is in horizontal position.

The brackets (2a) can be screwed, for example, to the internal walls of the cabinet or to the fixed runner of the drawer.

At the other end, the semi-shells (2) terminate with two rectilinear appendixes (2b) that form a sort of a fork with flat parallel forks provided with a long slot (3) with upturned U shaped design.

The slot (3) houses a sliding pin (4) with horizontal axis placed in transversal direction with respect to the longitudinal axis of the cylinder (1); the pin (4) connects a parallel pair of identical oscillating plates (5) inserted into the same pivoting pin (6) parallel to the pin (4).

The pin (6) is fixed at the end of the external section (7a) of the stem (7) of the cylinder (1), whose internal piston (8) has a perimeter series of longitudinal grooves (9) to pour oil from a chamber to the other one and an additional series of through holes (10) closed on one side by a small plate (11) constantly subjected to the action of a return spring (12) that prevents the oil from seeping through the holes (10) during the retraction of the stem (7) that coincides with the last part of the closing travel of the drawer.

The device of the invention also comprises a special hook-like bracket (S) fixed to the drawer (not shown) to fasten and unfasten the drawer automatically to and from the device of the invention, respectively during the alternate closing and opening travels.

More precisely, the bracket (S) has a deep hook-like notch (P) that receives the pin (4) and cooperates with it as a cam, in order to determine the correct overturning direction with respect to the pivoting pin (6).

A helicoidal cylindrical spring (13) is externally inserted into the stem (7) of the piston (8), whose alternate travels determine the compression and extension of the spring (13) in charge of closing the drawer automatically when the drawer is about to be perfectly and completely inserted in its housing.

More precisely, the spring is compressed during the first part of the opening travel of the drawer (as shown in FIGS. 4B and 5B), and extended during the ending part of the closing travel of the drawer, as shown in FIGS. 4A and 5A. Attention is drawn on the fact that the chamber (1a) of the cylinder (1) where oil is poured during the opening travel of the drawer is slightly conical in such a way that the distance between the external walls of the piston (8) and the internal walls of the chamber (1a) gradually reduces as the piston (8) moves back with the drawer, so that oil encounters a growing seeping resistance that ensures the soft gradual shock-absorbing action with respect to the drawer.

In the enclosed figures the conical section of the chamber (1a) is indicated with letter T.

In the first embodiment of FIGS. 4A and 4B, the spring (13) is situated inside the chamber (1b) of the cylinder (1) where oil is poured during the opening travel of the drawer; a compensation disk (14) is situated near the bottom of the chamber (1a), with the possibility of making short alternate travels inside the cylinder (1), constantly subjected to the pressure of a spring (15) that pushes it towards the piston (8).

The function of the compensation disk (14) is to compensate the difference in volume between the chambers (1a) and (1b) due to the presence of the stem (7) and the spring (13) inside the chamber (1b).

The embodiment shown in FIGS. 5A and 5B differs from the one illustrated in FIGS. 4A and 4B in the fact that the stem (70) goes through the piston (8) and comes out beyond the back bottom of the cylinder (1) and because the spring (13) is inserted into the section (70b) of the stem (70) that comes out from the back bottom and terminates with a threaded section (70c), where a cup (70d) is screwed to compress the spring (13) during the forward travel of the stem (70) pulled by the drawer during opening.

As in the first embodiment, the front section (70a) of the stem (70) comes out of the front bottom of the cylinder (1) and terminates with the pivoting pin (6) of the plates (5).

When the drawer is completely opened, the pin (4) that connects the pair of plates (5) is inserted and fitted in the front cavity (3a) of the slot (3), with the spring (13) is maximum compression and ready to be released in extension as soon as the pin (4) is extracted from the cavity (3a).

Because of the hook-like notch (P), when the drawer is pushed closed, the bracket (S) screwed under the drawer fastens the pin (4) with the notch (P), pushing it out of the cavity (3a) and favouring the free extension of the spring (13), with consequent backward travel of the stem (7, 70).

When the drawer is completely closed, the pin (4) rests on the bottom of the hook-like notch (P), from which it is pushed out automatically after the first part of the following opening travel of the drawer.

In the first part, the travel of the pin (4) is guided by the slots (3) having a first rectilinear section (3b) followed by a final section (3c) with descending direction that forces the pin (4) to move down, come out from the hook-like notch (P) of the bracket (S) progressively and engage inside the cavity (3a) where the pin is automatically fastened.

The presence of the compensation disk (14) is not necessary in the second embodiment, since the stem (70) goes through the chambers (1a and 1b) of the cylinder (f) and the spring (13) is in external position with respect to the oil chambers (1a and 1b) of the cylinder (1).

Finally, attention is drawn on the sloping shape (P1) of the bracket (S), which is joined with the opening of the hook-like notch (P).

The shape (P1) ensures the automatic restoration of the device if the pin (4) accidentally loses its correct operation position when released from the bracket (S), that is to say as long as the drawer is opened.

As a matter of fact, the pin (4) can accidentally raise and come out from its housing and fastening cavity (3a) with consequent backward travel of the stem (7, 70) under the return action of the spring (13) during free extension. In such a circumstance, the pin (4) would reach the raised position that it should reach after closing the drawer.

This means that, when the drawer is pushed closed, the pin (4) rests at a higher height than the opening of the hook-like notch (P), so that the automatic fastening of the pin (4) to the bracket (S) would be impossible.

The inclination given to the sloping shape (P1), on the contrary, favours the automatic restoration of the device, since the interference between the sloping shape (P1) and the pin (4) causes the downward overturning of the pin (4) that is pushed towards the opening of the hook-like notch (P1).

Overturning is also favoured by the lock pin (5a) situated on the oscillating plates (5) that, while rotating downwards with the pin (4), extract the stem (7, 70) from the cylinder (1) for a short section, thus loading the spring (13) that is released in extension as soon as the interference between the pin (4) and the sloping shape (P1) ceases.

The retraction of the stem (7, 70) causes the upward overturning of the oscillating plates (5) that resume opposite rotation around the lock pins (5a), thus raising the pin (4) and bringing it back onto the bottom of the hook-like notch (P1), restoring the condition for the correct operation of the device of the invention.

The invention claimed is:

1. A device for automatic shock-absorbed closing of pull-out furniture elements, in combination with the pull-out elements, comprising:
   a support (2) provided with first brackets (2a) for stable anchoring to a fixed part of a cabinet and frontally ending with two parallel prongs (2b), said prongs (2b) having longitudinal slots (3) having an inverted U-shape,
   a hydraulic cylinder (1) containing an oil and having a front bottom proximal to said prongs (2b) and back bottom distal to said prongs (2b), said hydraulic cylinder (1) being supported by said support (2),
   a stem (70) having a front section (70a) coming out of the front bottom of the cylinder (1) and a back section (70b) coming out of the back bottom of the cylinder (1), an internal piston (8) connected to said stem (70) and slidably mounted inside said cylinder (1) defining a first chamber (1b) and a second chamber (1a), the internal piston (8) of the cylinder having a first series of spaces (9) for the passage of oil from the first chamber (1b) to the second chamber (1a) and an additional series of through holes (10), a small plate (11) constantly subjected to the action of a return spring (12) in order to close one side of said internal piston (8) and prevent the oil from seeping through the holes (10) of the piston during the retraction of the stem (70) that coincides with the closing travel of the pull-out element, a sliding pin (4) having a horizontal axis being disposed in the longitudinal slots (3) of the prongs and connecting a parallel pair of identical oscillating plates (5), the oscillating plates being connected to a pivoting pin (6) applied at an end of said front section (70a) of the stem (70) of the cylinder (1), an helical cylindrical spring (13) being disposed around said back section (70b) of the stem (7) of the piston (8), a second bracket (S) attached to the pull-out element having a deep hook-like notch (P) that receives the sliding pin (4) and cooperates with said pin.

2. The combination as defined in claim 1 wherein the second chamber (1a) of the cylinder (1) where oil is poured during the opening travel of the pull-out element is slightly conical, so that the spacing between the piston (8) and the second chamber (1a) gradually reduces as the piston (8) moves toward the back bottom of the cylinder.

3. The combination as defined in claim 1 wherein comprising a cup (70d) screwed in a threaded section (70c) of said back section (70b) of said stem to compress the helical cylindrical spring (13) during the forward travel of the stem (70) together with the pull-out element during opening.

4. The combination as defined in claim 1, wherein said support (2) comprises an opposite pair of identical semi-shells (2) supporting and enclosing the cylinder (1), said semi-shells (2) being provided at one end with said first brackets (2a) for stable anchoring inside the body of the cabinet.

5. The combination as defined in claim 1, wherein
    the second bracket (S) has a sloping shape (P1) joined with the opening of the hook-like notch (P), and
    the oscillating plates (5) have a back lock pin (5a).

6. The combination as defined in claim 1, wherein the first series of spaces (9) are formed as longitudinal grooves along the external edge of the piston (8).

\* \* \* \* \*